Figure 1:
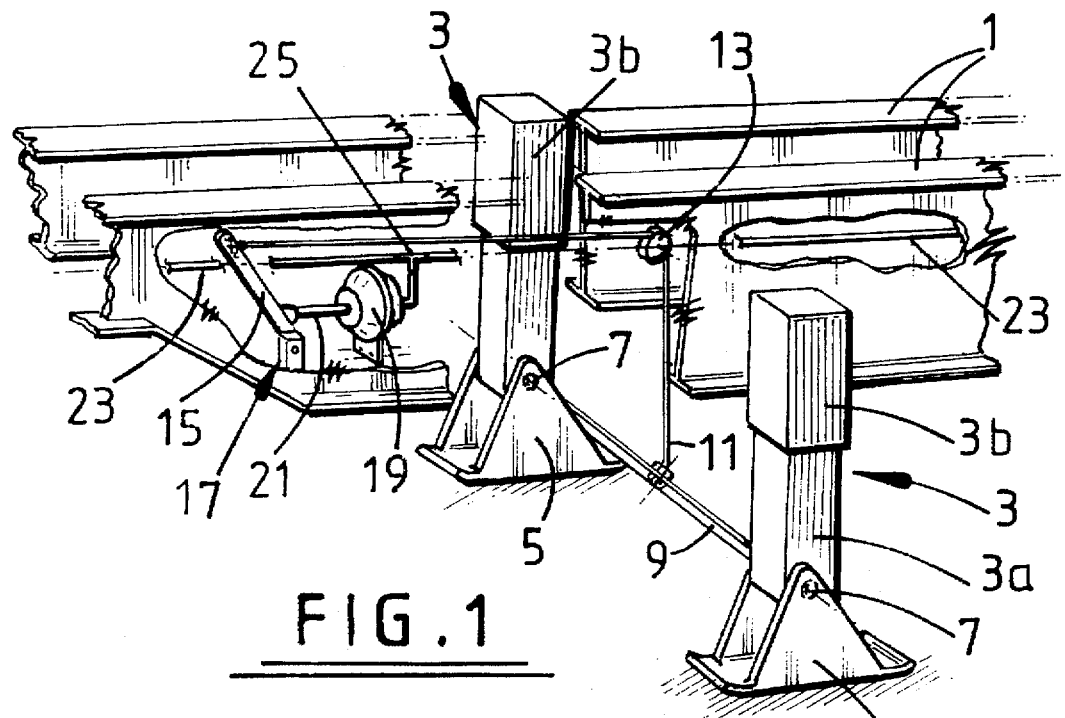

United States Patent [19]

Clarke et al.

[11] Patent Number: 5,709,362
[45] Date of Patent: Jan. 20, 1998

[54] ACTUATION OF SEMI-TRAILER SUPPORT LEGS

[75] Inventors: Martin Robert Clarke, Preston; Philip Pye, Rainford; Norman Zoltan Wignall, Chorley, all of United Kingdom

[73] Assignee: Pandoro Limited, Lancashire, United Kingdom

[21] Appl. No.: 440,371

[22] Filed: May 12, 1995

[30] Foreign Application Priority Data

May 14, 1994 [GB] United Kingdom ............... 9409685

[51] Int. Cl.$^6$ .......................................... A47F 5/00
[52] U.S. Cl. .................. 248/352; 248/188.5; 248/651; 248/688
[58] Field of Search ................. 280/475, 765.1, 280/766.1; 248/688, 354.1, 654, 659, 651, 669, 188.5, 188.6, 188.2, 352

[56] References Cited

U.S. PATENT DOCUMENTS

| | | | |
|---|---|---|---|
| 3,454,251 | 7/1969 | Dye | 280/765.1 |
| 3,563,567 | 2/1971 | Harp | 280/150.5 |
| 3,874,696 | 4/1975 | Gardner | 280/150.5 |
| 4,268,066 | 5/1981 | Davis | 280/763 |
| 4,312,520 | 1/1982 | Burman | 280/765 |
| 4,466,637 | 8/1984 | Nelson | 280/766.1 |
| 5,054,805 | 10/1991 | Hungerink | 248/352 |
| 5,141,197 | 8/1992 | Mackaay | 280/765.1 |
| 5,348,258 | 9/1994 | Rasmussen | 248/688 |
| 5,451,080 | 9/1995 | Kneile | 248/354.1 |

*Primary Examiner*—Leslie A. Braun
*Assistant Examiner*—Gwendolyn W. Baxter
*Attorney, Agent, or Firm*—Foley & Lardner

[57] ABSTRACT

The present invention relates to semi-trailer support legs. In order to avoid damage to trailer support legs by failure to raise the legs when the trailer is coupled to a towing unit for movement, the present invention provides a pivotal foot at the end of the support leg and an actuator for controlling pivotal movement of the foot between a raised position providing sufficient clearance for normal operation and a deployed position for supporting the trailer on uncoupling of the towing unit. More particularly raising and lowering of the pivotal foot is controlled automatically on coupling and uncoupling respectively of the towing unit and trailer.

A particularly convenient arrangement results where actuation of the foot is responsive to the connection and disconnection of a control line between the towing and trailer units. More particularly still, the control line is the emergency brake line which would be connected as a matter of course. The actuator is supplied from a branch off said emergency brake line.

19 Claims, 1 Drawing Sheet

ACTUATION OF SEMI-TRAILER SUPPORT LEGS

The present invention relates to semi-trailer support legs. In order to avoid damage to trailer support legs by failure to raise the legs when the trailer is coupled to a towing unit for movement, the present invention provides a pivotal foot at the end of the support leg and an actuator for controlling pivotal movement of the foot between a raised position providing sufficient clearance for normal operation and a deployed position for supporting the trailer on uncoupling of the towing unit. More particularly raising and lowering of the pivotal foot is controlled automatically on coupling and uncoupling respectively of the towing unit and trailer.

A particularly convenient arrangement results where actuation of the foot is responsive to the connection and disconnection of a control line between the towing and trailer units. More particularly still, the control line is the emergency brake line which would be connected as a matter of course. The actuator is supplied from a branch off said emergency brake line.

The present invention relates to semi-trailer support legs.

Semi-trailers are provided with a pair of transversely disposed landing legs for supporting the forward end of the trailer when decoupled from a towing vehicle, ie. a tractor unit or tug. Typically, the landing legs are telescopic and a gear mechanism is provided for raising and lowering the legs. The gear mechanism is manually operable by a cranked actuating handle. On connecting up a tractor unit an operator is required to raise the legs to provide sufficient clearance for normal use. Before disconnecting the tractor unit the legs have to be lowered and any service connections, ie. air and electrical lines, disconnected. In a typical trailer the connecting up of an (emergency) air line serves to release the trailer brakes and thus this is an essential operation in connecting tractor and trailer unit together.

Failure to raise the legs sufficiently often results in damage to the landing legs. Damage to the landing legs is a frequent occurrence in the loading and unloading of semi-trailers onto a ship since the trailers have to be moved up and down ramps where elevation of the loading legs is important if damage is to be avoided. The loading and unloading has to be performed quickly and the need to manually raise and lower the legs hampers the operation so that there is a tendency for the operator to raise the legs by the minimum he believes he can get away with.

Proposals have been made to replace the manually actuable crank with an air powered motor but still switched manually, and a more elaborate proposal still uses hydraulic rams to raise and lower the legs, also manually switched. These alternatives have been unsuccessful largely due to the cost and/or complication but also because they do not address completely the time considerations.

The present invention aims to provide a solution for these problems.

Accordingly, one aspect of the present invention provides means to automatically effect raising and lowering of trailer support means in response to disconnection and connection respectively of a line connection between the trailer and a towing unit.

It is preferred that the line connection which is used to trigger automatic raising and lowering is an airline connection and preferably that provided for controlling release of the trailer brake especially the emergency (red) brake line. Conveniently a line tapped off the said airline powers an air actuator such that pressurization of the line serves to operate the actuator and via a suitable mechanism raises a support element. Lowering of the support element on exhaustion of the line may be under gravity or spring assisted. Preferably the mechanism operates a support foot pivotally mounted at the end of a leg extending from the trailer structure.

Another aspect of the invention provides at least one support leg for a semi-trailer comprising a support member extending from the trailer and a foot carried pivotally at the end of the support member and wherein the foot is pivotable between a raised position providing sufficient clearance for normal operation and a deployed position.

The support member may comprise an existing telescopic landing leg with its foot replaced with the aforedescribed pivotal foot. For a typical application where two landing legs are provided a transverse link interconnects the respective feet and is loosely connected thereto to permit slightly different angular orientation of the respective feet. Means for actuating the feet couples with said interconnecting member. Alternatively separate actuating means may be provided for each foot. The pivotal foot and actuating means may be supplied as a kit of parts to adapt the existing trailer landing legs.

The shape of the foot is chosen to aid stability when deployed and it is preferred for the foot to extend by different amounts forwardly and rearwardly of a vertical plane passing through the pivot axis.

Conveniently an interlock is provided to hold the foot in a raised position to avoid accidental deployment during normal road use of the trailer.

Figure 2:
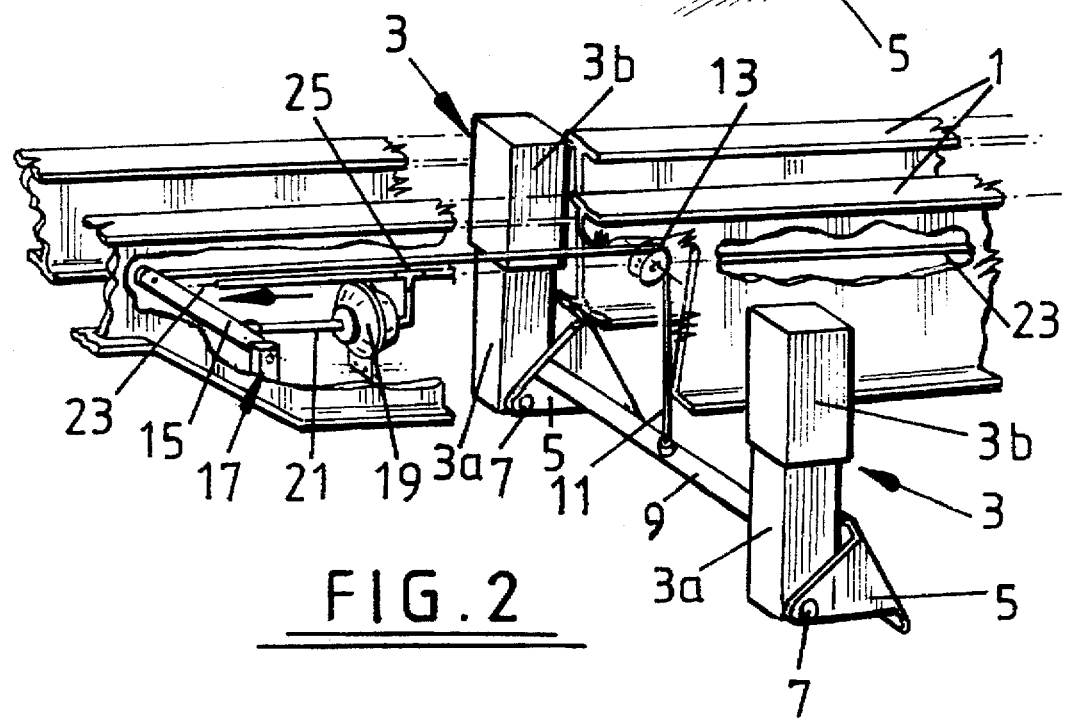

The present invention will now be described further, by way of example only, with reference to the accompanying drawings, in which:

FIG. 1 is an exploded perspective view showing the landing legs in a lowered position, and FIG. 2 an exploded perspective view showing the landing legs in a raised position.

Referring to the drawings, part of the longitudinal chassis members of a semi-trailer are illustrated at 1 broken away and comprising a pair of parallel longitudinal members and these carry either directly or by way of outriggers a pair of landing legs 3. In the illustrated embodiment each of the landing legs comprises two elongate members with the first 3a movable longitudinally within a second 3b by way of a standard gear actuated raise and lower mechanism (not illustrated). This is conventional in the art, but is optional for the purposes of the present invention, and the telescopic arrangement could be dispensed wit, and a fixed length strut employed. The lower end of each landing leg is provided with a foot 5 pivotally mounted thereto about pivot axis 7 and a transverse link member 9 is loosely connected between the respective feet. An actuating wire 11 is connected to the link at an intermediate position and passes over a pulley 13 to connect to the end of an operating lever 15 pivotally mounted at pivot 17 with respect to the trailer chassis. An air actuator 19 mounted to the chassis has its operating strut 21 connected to the actuating lever to position intermediate the pivot and cable connection. The air actuator is supplied with air from an emergency (red) brake airline 23 by way of a convenient T-piece 25. Conveniently restriction is provided in the supply line to the actuator to reduce the speed of operation.

When viewed side on the point of operation of the actuating cable is offset rearwardly from the pivot axis so that operation of the cable serves to pivot the feet rearwardly. The feet themselves have a vertical dimension greater than the forward offset direction so that pivoting upwardly through approximately 90° gives the desired clearance.

Raising and lowering occurs automatically thus on making the emergency line connection to the trailer from the towing unit air is supplied to the trailer emergency brake line 23 to release them and also into the air actuating chamber 19 so as to extend its actuating bar 1 pivoting the actuating lever 15 and raising the feet 5. When the tractor unit is being disconnected from the trailer unit the airline is released thus exhausting air pressure whereupon the feet lower under their own weight since they are no longer restrained by the cable actuator.

Advantageously a latching mechanism, not illustrated, is employed to hold the feet in the raised position. With coupling of the feet a single latch, conveniently comprising a spring biased bolt carried on the link 19 and engageable with an abutment carried by the leg, can be used to hold the feet in the elevated position. This latch is quick to operate and its provision is a useful safety check that the feet have elevated.

The principal aim of the invention is to provide automatic raising and lowering of the support legs but it will be apparent that the pivotal arrangement can be achieved much more quickly than the current geared raising and lowering of the landing legs and so, in itself, provides a partial solution to the problem. It will also be apparent that other lines could be used to implement the automatic actuation, but the emergency line is considered to be the most appropriate.

We claim:

1. A method of raising and lowering support means of a semi-trailer, the support means comprising a support foot mounted pivotally at the end of a landing leg extending from the trailer structure, the foot being independently pivotable between a raised position providing sufficient clearance for the semi-trailer to be moved, and a deployed position for ground engagement support purposes; and an actuator means to control pivoting of said foot, the method comprising automatically raising and lowering said pivoting foot in response to connection and disconnection respectively of a line connection between the trailer and a towing unit.

2. The method according to claim 1 in which the line connection is an air line connection.

3. The method according to claim 1 wherein the line connection is provided for controlling release of a trailer brake.

4. The method according to claim 3 in which the line connection is an emergency brake line.

5. The method according to claim 1 in which said line communicates with the actuator means.

6. The method according to claim 1 in which pressurization of the line connection serves to raise the support means.

7. The method according to claim 6 in which depressurization of the line connection allows lowering of the support means under gravity.

8. The method according to claim 6 in which depressurization of the line connection allows lowering of the support means under gravity.

9. A trailer support for supporting a trailer above ground when the trailer is disconnected from a towing unit, the trailer support comprising:

a landing leg for attachment to the trailer;

a foot pivotally coupled to the leg about an axis, wherein the foot is pivotable relative to and independently of the leg about the axis between a raised position providing sufficient clearance for the trailer to be moved and a deployed position for ground engagement; and an actuator coupled to the foot for pivoting the foot between the raised position and the depoloyed position.

10. The trailer support according to claim 9 in which the landing leg is telescopically adjustable.

11. The trailer support according to claim 9 comprising:

two pivotal feet mounted to a respective landing leg and wherein a transverse link interconnects the respective feet.

12. The trailer support according to claim 11 wherein the actuator operates on the transverse link to pivot the respective feet.

13. The trailer support according to claim 9 wherein the actuator is an air actuator.

14. The trailer support according to claim 9 wherein the foot extends by different amounts forwardly and rearwardly of a vertical plane passing through its pivot axis to aid stability when deployed.

15. The trailer support according to claim 9 further comprising an interlock to hold the foot in a raised position.

16. The trailer support according to claim 9 wherein the foot has a vertical dimension so as to substantially space the leg from the ground when the foot is in the deployed position.

17. A trailer support for supporting a trailer when the trailer is disconnected from a towing unit, the trailer support comprising:

a landing leg for attachment to the trailer;

a foot pivotally coupled to the landing leg;

a connector for connecting the trailer and the towing unit; and an actuator operably coupled between the connector and the foot, wherein the actuator pivots the foot relative to and independently of the leg in response to the connector being connected to and disconnected from one of the trailer and the towing unit.

18. The trailer support of claim 17 wherein the landing leg is telescopically adjustable.

19. A kit of parts to provide an existing landing leg of a trailer with automatic deployment and retraction in response to the trailer being disconnected from and connected to a towing unit, the kit comprising:

a foot configured for being pivotally coupled to the existing landing leg, wherein the foot pivots independently of the leg between a first ground engaging deployment position and a second ground clearing raised position; and an actuator operably coupled to the foot and configured for being operably coupled to a connector connecting the trailer to the towing unit, wherein the actuator pivots the foot relative to and independently of the leg in response to the connector being disconnected to and connected from one of the trailer and the towing unit.

* * * * *